United States Patent
Chilla et al.

(10) Patent No.: US 8,865,262 B2
(45) Date of Patent: Oct. 21, 2014

(54) PROCESS FOR PRODUCING MULTI-LAYER COATINGS IN LIGHT METALLIC COLOR SHADES

(75) Inventors: Marc Chilla, Sprockhoevel (DE); Michael Georgiadis, Wuppertal (DE); Volker Kegel, Wuppertal (DE); Gunter Richter, Wuppertal (DE)

(73) Assignee: Axalta Coating Systems IP Co., LLC, Wilmington, DE (US)

( * ) Notice: Subject to any disclaimer, the term of this patent is extended or adjusted under 35 U.S.C. 154(b) by 1113 days.

(21) Appl. No.: 12/560,516

(22) Filed: Sep. 16, 2009

(65) Prior Publication Data

US 2010/0143705 A1    Jun. 10, 2010

Related U.S. Application Data

(63) Continuation-in-part of application No. 10/575,322, filed on Apr. 6, 2006, now abandoned.

(51) Int. Cl.
*B05D 5/06* (2006.01)
*B05D 7/14* (2006.01)
*B05D 1/36* (2006.01)

(52) U.S. Cl.
USPC ........................ 427/407.1; 427/419.1

(58) Field of Classification Search
USPC ............................. 427/407.1, 419.1
See application file for complete search history.

(56) References Cited

U.S. PATENT DOCUMENTS

| | | |
|---|---|---|
| 4,403,866 A * | 9/1983 | Falcoff et al. ................. 366/132 |
| 4,558,090 A | 12/1985 | Drexler et al. |
| 4,851,460 A | 7/1989 | Stranghoener et al. |
| 4,914,148 A | 4/1990 | Hille et al. |
| 4,948,829 A | 8/1990 | Mitsuji et al. |
| 5,332,767 A | 7/1994 | Reisser et al. |
| 5,342,882 A | 8/1994 | Goebel et al. |
| 5,574,166 A | 11/1996 | Winter et al. |
| 5,709,909 A | 1/1998 | Leibfarth et al. |
| 5,760,123 A | 6/1998 | Vogt-Birnbrich et al. |
| 5,968,655 A | 10/1999 | Hartung et al. |
| 5,976,343 A * | 11/1999 | Schlaak ........................ 205/198 |
| 6,368,719 B1 | 4/2002 | Siever et al. |
| 7,172,812 B2 | 2/2007 | Greiwe et al. |
| 2003/0054193 A1 | 3/2003 | McCollum et al. |
| 2003/0098238 A1 | 5/2003 | Kulfan et al. |
| 2004/0115358 A1* | 6/2004 | Ishikawa et al. ........... 427/407.1 |

FOREIGN PATENT DOCUMENTS

| | | |
|---|---|---|
| EP | 0576943 A1 | 1/1994 |
| WO | 9418278 A2 | 8/1994 |
| WO | 9747401 A1 | 12/1997 |

OTHER PUBLICATIONS

Kiehl et al., Encapsulated Aluminum Pigments, Progress in Organic Coatings 37 (1999) 179-183.*

* cited by examiner

*Primary Examiner* — William Phillip Fletcher, III
(74) *Attorney, Agent, or Firm* — Ingrassia Fisher & Lorenz, P.C.

(57) ABSTRACT

A process for producing multi-layer coatings in light metallic color shades and reducing UV transmission there-through comprising the successive steps of:
(1) applying a 10 to 30 μm thick base coat layer to a pre-coated substrate,
(2) applying a clear coat layer onto the base coat layer, and
(3) jointly curing the base coat and clear coat layers,
wherein the base coat layer is applied from an unmodified water-borne metallic base coat having a ratio by weight of pigment to resin solids of 0.3:1 to 0.45:1, wherein the pigment content consists of 90% to 100% by weight of at least one non-leafing aluminum pigment with a platelet thickness over 100 to 500 nm and 0 to 10% by weight of at least one pigment different from aluminum pigments, wherein the pigment(s) different from aluminum pigments are selected in such a way that the multi-layer coating obtained exhibits a brightness L* (according to CIEL*a*b*, DIN 6174), of at least 80 units.

6 Claims, No Drawings

PROCESS FOR PRODUCING MULTI-LAYER COATINGS IN LIGHT METALLIC COLOR SHADES

CROSS-REFERENCE TO RELATED APPLICATION

This is a CIP of U.S. application Ser. No. 10/575,322, filed Apr. 6, 2006, now abandoned, which is a continuation of International Application No. PCT/US2005/034255, filed Sep. 27, 2005, which was published under PCT Article 21(2), which is a continuation of U.S. application Ser. No. 10/950,615, filed Sep. 27, 2004.

FIELD OF THE INVENTION

The invention relates to a process for the production of multi-layer coatings in light metallic color shades (bright metallic hues) that are well-known in automotive coating. Light metallic color shades exhibit a so-called "brightness flop" and, dependent on the composition of the pigment content, they may exhibit a color flop as well. "Flop" means the behavior to change brightness or color dependent on the observation angle.

DESCRIPTION OF THE PRIOR ART

Automotive coatings consist as a rule of a separately baked electrodeposition coating (EDC) primer, a separately baked primer surfacer layer (filler layer) applied thereto and a top coat applied thereto comprising a wet-on-wet applied color- and/or special effect-imparting base coat layer and a protective, gloss-imparting, clear coat layer. The total primer surfacer layer plus base coat layer thickness is generally 30 to 60 μm, being more particularly in the lower range of 30 to 45 μm for metallic color shades.

Processes are known from WO 97/47401, U.S. Pat. No. 5,976,343, U.S. Pat. No. 5,709,909 and U.S. Pat. No. 5,968,655 for the production of decorative multi-layer coatings, which processes allow for the elimination of the application and separate baking of a primer surfacer layer which, of course, reduces coating material consumption and the total layer thickness. These processes have in common the fact that a multi-layer coating structure comprising a first, modified water-borne base coat, a second, unmodified water-borne base coat and a clear coat are applied by a wet-on-wet-on-wet process comprising the joint curing of these three coating layers that are applied to a baked EDC primer. In practice, these processes use two base coat layers that allow for markedly lower total layer thicknesses by approximately 15 to 25 μm, than that of a conventional primer surfacer layer and base coat layer. The modified water-borne base coat is produced in these processes from an unmodified water-borne base coat by mixing with an admixture component and is intended to replace the function of a conventional primer surfacer. WO 97/47401 recommends as an admixture component the addition of polyisocyanate crosslinking agent, while U.S. Pat. No. 5,976,343 describes the addition of polyurethane resin, and U.S. Pat. No. 5,709,909 and U.S. Pat. No. 5,968,655 describe the addition of a filler (extender) paste.

A weakness of the processes disclosed in the aforementioned patents is that the production of multi-layer coatings in light metallic color shades, in particular silver color shades, is not readily possible. The reason is that UV light (UV radiation), as a constituent of natural daylight, can pass through the coating layers applied to the EDC primer and attack the surface of the EDC primer to a noticeable extent in the absence of a primer surfacer layer and thereby cause degradation of the EDC primer.

From the point of view of the observer, the multi-layer coating structure appears to be an opaque coating. However, an inadmissibly large amount of UV light may penetrate through the multi-layer structure of the clear coat, unmodified water-borne base coat and modified water-borne base coat to reach the surface of the EDC primer and cause long term damage to the EDC layer. For example, the UV light may penetrate through the multi-layer coating structure to an extent exceeding the specified UV transmission level and reach the EDC layer. Car manufacturers' specifications state, for example, that UV transmission through the base coat layer in the area of the complete outer skin of the vehicle body should amount to less than 0.1% in the wavelength range of from 290 to 380 nm and less than 0.5% in the wavelength range of from 380 to 400 nm. The possible undesired long-term consequences of an inadmissible level of UV light penetration to the EDC layer are chalking of the EDC layer and delamination of the multi-layer coating over the service life of the coated substrates.

The use of UV absorbers in clear coats or base coats is known, for example, from U.S. Pat. No. 5,574,166 and WO 94/18278, and is a solution to the problem of delamination. However, UV absorbers cannot be used to a very great extent in the base coat layers and/or the clear coat layer because of the migration tendency of the UV absorbers and because of the gradual degradation of the UV absorbers, as well as for cost reasons.

Other solutions, which approach the delamination problem from the EDC side are known from EP 0 576 943, U.S. Pat. No. 6,368,719, U.S. 2003/0054193 A1 and U.S. 2003/0098238 A1. These disclose the use of EDC coating compositions which are resistant to the action of UV light due to specially selected binders or due to the addition of suitable additives. This inevitably restricts the EDC composition, such that concessions may have to be made in relation to other technological properties, such as, for example, corrosion protection.

Alternatively, the modified and/or the unmodified water-borne base coat could be applied in an overall higher layer thickness sufficient to prevent to an adequate degree the access of UV light to reach the EDC primer. However, this would be a backward technological step in the direction of higher total film thickness.

If it is desired to increase the hiding power and/or to reduce the UV transmission, without raising the base coat layer thickness, the pigment content relative to the resin solids content in the water-borne metallic base coat can be increased. The pigment content of water-borne base coats with light metallic color shades consists to a high proportion of, for example, 60 to 100% by weight, frequently in the range of 90 to 100% by weight, of non-leafing aluminum pigments. If the pigment content is increased, these high contents of non-leafing aluminum pigments relative to the resin solids content will be reached.

SUMMARY OF THE INVENTION

It has now been found that it is possible to avert the weakening of technological properties (e.g. stone chip resistance, humidity resistance) of multi-layer coatings produced with the use of such water-borne base coats. The weakening is associated with high contents of non-leafing aluminum pigments, if particular non-leafing aluminum pigments are used in a suitable quantitative proportion in the water-borne base coats. In other words, technologically acceptable multi-layer coatings in light metallic color shades can be produced using water-borne base coats with high pigment contents if a sufficient quantitative proportion of specific non-leafing aluminum pigments is used in the water-borne base coats.

The invention according to one embodiment is directed to a process for the production of multi-layer coatings in light metallic color shades, comprising the successive steps of:
(1) applying a 5 to 20 μm thick base coat layer to a pre-coated substrate,
(2) applying a clear coat layer onto the base coat layer,
(3) jointly curing the base coat and clear coat layers,
wherein the base coat layer is applied from an unmodified water-borne metallic base coat which has a ratio by weight of pigment content to resin solids content of 0.3:1 to 0.45:1, preferably of 0.3:1 to 0.4:1, wherein the pigment content consists of from 60% to 100% by weight, in particular 90% to 100% by weight, of at least one non-leafing aluminum pigment with a platelet thickness of over 100 to 500 nm and 0 to 40% by weight, in particular 0 to 10% by weight, of at least one pigment different from aluminum pigments, wherein the pigment(s) different from aluminum pigments are selected by nature and quantity in such a way that the multi-layer coating obtained on the conclusion of process step (3) exhibits a brightness L* (according to CIEL*a*b*, DIN 6174), measured at an illumination angle of 45 degrees to the perpendicular (surface normal) and an observation angle of 15 degrees to the specular (specular reflection), of at least 80 units and wherein at least 50% by weight, preferably at least 70% by weight, of the non-leafing aluminum pigment(s) are selected from the group consisting of non-leafing aluminum pigments passivated by chromating, non-leafing aluminum pigments coated with a silicon-oxygen network (silicon-oxygen matrix) and combinations thereof.

According to an alternate embodiment, the invention is a method for reducing UV transmission through a multi-layer light metallic color shade coating system wherein the multi-layer coating system consists essentially of:
(i) an electrocoat primer layer adhered directly to a substrate;
(ii) a first basecoat layer, comprising a blend of an unmodified water-borne metallic basecoat with an admixture component, adhered to the electrocoat primer;
(iii) a second basecoat layer, comprising the unmodified water-borne metallic basecoat, adhered to the first basecoat layer, wherein the total thickness of said first basecoat layer plus said second base coat layer is from 10 μm to 30 μm, and
(iv) a clear topcoat layer adhered to the second basecoat layer, wherein the method comprises incorporating into said second metallic basecoat layer a ratio by weight of pigment content to resin solids content of 0.3:1 to 0.45:1, wherein the pigment content consists essentially of (a) from 90% to 100% by weight of at least one non-leafing aluminum pigment with a platelet thickness of over 100 nm to 500 nm, and wherein at least 50% by weight of said non-leafing aluminum pigment(s) are selected from the group consisting of non-leafing aluminum pigments passivated by chromating, non-leafing aluminum pigments coated with a silicon-oxygen network, and combinations thereof, and (b) from 0% to 10% by weight of at least one other pigment that is different from aluminum pigments, and the pigment(s) different from aluminum pigments are selected to yield a brightness L* of the multi-layer light metallic color shade coating system (according to CIEL*a*b*, DIN 6174), of at least 80 units measured at an illumination angle of 45 degrees to the perpendicular and an observation angle of 15 degrees to the specular, whereby the UV transmission through the multi-layer coating system from the clear topcoat layer to the electrocoat primer layer is less than 0.1% in the wavelength range from 290 to 380 nm and less than 0.5% in the wavelength range from 380 to 400 nm.

In yet another embodiment, the invention is an improved multi-layer light metallic color shade coating system for a substrate wherein the multi-layer coating system consists essentially of:
(i) an electrocoat primer layer adhered directly to the substrate;
(ii) a first basecoat layer comprising a blend of an unmodified water-borne metallic basecoat with an admixture component, adhered to the electrocoat primer;
(iii) a second basecoat layer comprising the unmodified water-borne metallic basecoat adhered to the first basecoat layer, wherein the total thickness of said first basecoat layer plus said second base coat layer is from 10 μm to 30 μm, and
(iv) a clear topcoat layer adhered to the second unmodified basecoat layer,
wherein the improvement comprises incorporating into the second metallic basecoat layer a ratio by weight of pigment content to resin solids content of 0.3:1 to 0.45:1, wherein the pigment content consists essentially of (a) from 90% to 100% by weight of at least one non-leafing aluminum pigment with a platelet thickness of over 100 nm to 500 nm, and wherein at least 50% by weight of said non-leafing aluminum pigment(s) are selected from the group consisting of non-leafing aluminum pigments passivated by chromating, non-leafing aluminum pigments coated with a silicon-oxygen network and combinations thereof, and (b) from 0% to 10% by weight of at least one other pigment that is different from aluminum pigments, and the pigment(s) different from aluminum pigments are selected to yield a brightness L* of the multi-layer light metallic color shade coating system (according to CIEL*a*b*, DIN 6174), of at least 80 units measured at an illumination angle of 45 degrees to the perpendicular and an observation angle of 15 degrees to the specular, whereby UV transmission through the multi-layer coating system from the clear topcoat layer to the electrocoat primer layer is less than 0.1% in the wavelength range from 290 to 380 nm and less than 0.5% in the wavelength range from 380 to 400 nm.

DETAILED DESCRIPTION OF THE EMBODIMENTS

The features and advantages of the present invention will be more readily understood, by those of ordinary skill in the art, from reading the following detailed description. It is to be appreciated those certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

In a particular embodiment of the process according to the invention the advantages of the processes according to WO 97/47401, U.S. Pat. No. 5,976,343, U.S. Pat. No. 5,709,909 and U.S. Pat. No. 5,968,655 (omission of primer surfacer application, and low total film thickness) may be retained and a long term destructive access of UV light to the EDC primer nonetheless can be adequately prevented. UV transmission through the base coat layer formed of modified water-borne metallic base coat and unmodified water-borne metallic base coat may then be adjusted to less than 0.1% in the wavelength range of from 290 to 380 nm and to less than 0.5% in the wavelength range of from 380 to 400 nm, whereby, for example, corresponding car manufacturers' specifications may be fulfilled.

A particular embodiment of the invention is a process for the production of multi-layer coatings in light metallic color shades, comprising the successive steps:
(1) applying a 10 to 30 μm thick base coat layer to a substrate provided with an EDC primer,
(2) applying a clear coat layer onto the base coat layer,
(3) jointly curing the base coat and clear coat layers,
wherein the base coat layer is applied in a first layer and in a second layer; the first layer comprises a modified water-borne metallic base coat produced by mixing an unmodified water-borne metallic base coat with an admixture component and the second layer comprises the unmodified water-borne metallic base coat, wherein the unmodified water-borne metallic base coat has a ratio by weight of pigment content to resin solids content of 0.3:1 to 0.45:1, preferably of 0.3:1 to 0.4:1, wherein the pigment content consists 60 to 100% by weight, in particular 90 to 100% by weight, of at least one non-leafing aluminum pigment with a platelet thickness of over 100 to 500 nm and 0 to 40% by weight, in particular 0 to 10% by weight, of at least one pigment different from aluminum pigments, wherein the pigment(s) different from aluminum pigments are selected by nature and quantity in such a way that the multi-layer coating obtained on the conclusion of process step (3) exhibits a brightness L* (according to CIEL*a*b*, DIN 6174), measured at an illumination angle of 45 degrees to the perpendicular and an observation angle of 15 degrees to the specular, of at least 80 units and wherein at least 50% by weight, preferably at least 70% by weight, of the non-leafing aluminum pigment(s) are selected from the group consisting of non-leafing aluminum pigments passivated by chromating, non-leafing aluminum pigments coated with a silicon-oxygen network and combinations thereof.

The term "pigment content" means the sum of all the pigments contained in a coating composition without fillers (extenders). The term "pigments" is used here as in DIN 55944 and covers, in addition to special effect pigments, inorganic white, colored and black pigments and organic colored and black pigments. At the same time, therefore, DIN 55944 distinguishes between pigments and fillers.

The substrates to be coated in the process according to the invention are pre-coated substrates, in particular substrates pre-coated with a conventional EDC primer and conventional primer surfacer layer, in particular correspondingly pre-coated automotive bodies or body parts.

In what follows the description relates in particular to the particular embodiment of the process according to the invention. Unless obviously limited to the particular embodiment, it also, however, naturally relates to the process according to the invention in its general form.

In the particular embodiment of the process according to the invention, conventional substrates provided with an EDC primer are coated. In particular, the substrates are automotive bodies or body parts provided with an EDC primer, in particular, a cathodic electrodeposition (CED) coating. The production of substrates provided with an EDC primer is known to the person skilled in the art. There are no restrictions with regard to the selection of the EDC primer; in particular, EDC primers are also suitable which would be damaged by long-term exposure to UV light.

In the particular embodiment of the process according to the invention, the substrates having an EDC primer are provided, first of all, with a 10 to 30 μm thick base coat layer. The base coat layer is applied in two layers, i.e., a first layer, for example, 5 to 20 μm thick of a modified water-borne metallic base coat produced by mixing an unmodified water-borne metallic base coat with an admixture component is applied and a subsequent second layer, for example, 2 to 10 μm thick of the unmodified water-borne metallic base coat then is applied. The total film thickness of the base coat layer is dependent inter alia on color shade; car manufacturers' requirements for base coat film thickness are expressed in the so-called process film thickness (average film thickness which is desired over the entire body in the automotive original coating process), which is directed towards the film thickness for each base coat color shade required to achieve the desired color shade on the substrate and to achieve technological properties (e.g., stone chip resistance) and towards an economic application of the relevant water-borne base coat, i.e., in as thin a film as possible. The total base coat film thickness ranges from 10 to 30 μm and is the sum of, for example, 5 to 20 μm of the modified water-borne metallic base coat plus, for example, 2 to 10 μm of the unmodified water-borne metallic base coat. Such film thicknesses for base coats meet the requirements for coating the relevant substrates, for example, automotive bodies. In particular, this means that a specific value within this range from 10 to 30 μm represents the process film thickness for a particular individual water-borne metallic base coat.

The film thicknesses indicated in the present description and in the claims for coating layers refer in each case to dry film thicknesses.

In the description and in the claims, a distinction is drawn between unmodified and modified water-borne metallic base coats.

According to an alternate embodiment, the invention is a method for reducing UV transmission through a multi-layer light metallic color shade coating system wherein the multi-layer coating system consists essentially of:
(i) an electrocoat primer layer adhered directly to a substrate;
(ii) a first basecoat layer, comprising a blend of an unmodified water-borne metallic basecoat with an admixture component, adhered to the electrocoat primer;
(iii) a second basecoat layer, comprising the unmodified water-borne metallic basecoat, adhered to the first basecoat layer, wherein the total thickness of said first basecoat layer plus said second base coat layer is from 10 μm to 30 μm, and
(iv) a clear topcoat layer adhered to the second basecoat layer,
wherein the method comprises incorporating into said second metallic basecoat layer a ratio by weight of pigment content to resin solids content of 0.3:1 to 0.45:1, wherein the pigment content consists essentially of (a) from 90% to 100% by weight of at least one non-leafing aluminum pigment with a platelet thickness of over 100 nm to 500 nm, and wherein at least 50% by weight of said non-leafing aluminum pigment(s) are selected from the group consisting of non-leafing aluminum pigments passivated by chromating, non-leafing aluminum pigments coated with a silicon-oxygen network, and combinations thereof, and (b) from 0% to 10% by weight of at least one other pigment that is different from aluminum pigments, and the pigment(s) different from aluminum pigments are selected to yield a brightness L* of the multi-layer light metallic color shade coating system (according to CIEL*a*b*, DIN 6174), of at least 80 units measured at an illumination angle of 45 degrees to the perpendicular and an observation angle of 15 degrees to the specular, whereby the UV transmission through the multi-layer coating system from the clear topcoat layer to the electrocoat primer layer is less than 0.1% in the wavelength range from 290 to 380 nm and less than 0.5% in the wavelength range from 380 to 400 nm.

In yet another embodiment, the invention is an improved multi-layer light metallic color shade coating system for a substrate wherein the multi-layer coating system consists essentially of:

(i) an electrocoat primer layer adhered directly to the substrate;
(ii) a first basecoat layer comprising a blend of an unmodified water-borne metallic basecoat with an admixture component, adhered to the electrocoat primer;
(iii) a second basecoat layer comprising the unmodified water-borne metallic basecoat adhered to the first basecoat layer, wherein the total thickness of said first basecoat layer plus said second base coat layer is from 10 μm to 30 μm, and
(iv) a clear topcoat layer adhered to the second unmodified basecoat layer, wherein the improvement comprises incorporating into the second metallic basecoat layer a ratio by weight of pigment content to resin solids content of 0.3:1 to 0.45:1, wherein the pigment content consists essentially of (a) from 90% to 100% by weight of at least one non-leafing aluminum pigment with a platelet thickness of over 100 nm to 500 nm, and wherein at least 50% by weight of said non-leafing aluminum pigment(s) are selected from the group consisting of non-leafing aluminum pigments passivated by chromating, non-leafing aluminum pigments coated with a silicon-oxygen network and combinations thereof, and (b) from 0% to 10% by weight of at least one other pigment that is different from aluminum pigments, and the pigment(s) different from aluminum pigments are selected to yield a brightness $L^*$ of the multi-layer light metallic color shade coating system (according to CIEL*a*b*, DIN 6174), of at least 80 units measured at an illumination angle of 45 degrees to the perpendicular and an observation angle of 15 degrees to the specular, whereby UV transmission through the multi-layer coating system from the clear topcoat layer to the electrocoat primer layer is less than 0.1% in the wavelength range from 290 to 380 nm and less than 0.5% in the wavelength range from 380 to 400 nm.

The unmodified water-borne metallic base coats, from which the modified water-borne metallic base coats may be produced by mixing with an admixture component, as explained in more detail below, are aqueous coating compositions having a ratio by weight of pigment content to resin solids content of 0.3:1 to 0.45:1, preferably of 0.3:1 to 0.4:1. In addition to water, a resin solids content, which comprises binder(s), optionally, paste resin(s), optionally, reactive thinner(s) and optionally, cross-linking agent(s), the pigments making up the pigment content, optionally, filler(s) and optionally, organic solvent(s), the unmodified water-borne metallic base coats contain in general also conventional coating additive(s).

The unmodified water-borne metallic base coats contain ionically and/or non-ionically stabilized binder systems. These are preferably anionically and/or non-ionically stabilized. Anionic stabilization is preferably achieved by at least partially neutralized carboxyl groups in the binder, while non-ionic stabilization is preferably achieved by lateral or terminal polyethylene oxide units in the binder. The unmodified water-borne metallic base coats may be physically drying or crosslinkable by formation of covalent bonds. The crosslinkable unmodified water-borne metallic base coats forming covalent bonds may be self- or externally crosslinkable systems.

The unmodified water-borne metallic base coats contain one or more conventional film-forming binders. They may optionally also contain crosslinking agents if the binders are not self-crosslinkable or physically drying. Examples of film-forming binders, which may be used, are conventional polyester, polyurethane, (meth)acrylic copolymer resins and/or hybrid binders derived from these classes of binder. Selection of the optionally contained crosslinking agents depends, in a manner familiar to the person skilled in the art, on the functionality of the binders, i.e., the crosslinking agents are selected in such a way that they exhibit a reactive functionality complementary to the functionality of the binders. Examples of such complementary functionalities between binder and crosslinking agent are: carboxyl/epoxy, hydroxyl/methylol ether and/or methylol (methylol ether and/or methylol preferably, as crosslinkable groups of amino resins, in particular, melamine resins).

The pigment content of the unmodified water-borne metallic base coats consists 60 to 100% by weight, in particular, 90 to 100% by weight, of one or more non-leafing aluminum pigments with a platelet thickness of over 100 to 500 nm and 0 to 40% by weight, in particular, 0 to 10% by weight, of one or more pigments different from aluminum pigments.

The non-leafing aluminum pigments are as such conventional aluminum pigments causing a brightness flop, such as are used in water-borne metallic base coats to produce multilayer coatings of the base coat/clear coat type. Their platelet thickness is over 100 to 500 nm and their mean particle size is, for example, 5 to 33 μm.

In terms of achieving of good technological properties of the multi-layer coatings, it is essential for the invention that at least 50% by weight, preferably at least 70% by weight, in particular 100% by weight of the non-leafing aluminum pigment(s) are non-leafing aluminum pigments that are selected from the group consisting of non-leafing aluminum pigments passivated by chromating, non-leafing aluminum pigments coated with a silicon-oxygen network and combinations thereof. The non-leafing aluminum pigments coated with a silicon-oxygen network are particularly preferred. At most 50% by weight, preferably not more than 30% by weight, in particular, 0% by weight of the non-leafing aluminum pigments in the unmodified water-borne metallic base coats are untreated or uncoated or treated or coated in a different way, for example, by phosphating.

Non-leafing aluminum pigments passivated by chromating are known. Examples of commercially available non-leafing aluminum pigments passivated by chromating are the non-leafing aluminum pigments sold by the firm Eckart-Werke under the name "STAPA Hydrolux®".

Non-leafing aluminum pigments coated with a silicon-oxygen network and their production are also known, for example, from WO 99/57204, U.S. Pat. No. 5,332,767 and from A. Kiehl and K. Greiwe, Encapsulated aluminum pigments, Progress in organic coatings 37 (1999), pp. 179 to 183.

The surface of the non-leafing aluminum pigments is provided with a coating of a silicon-oxygen network. The silicon-oxygen network can be connected to the surface of the non-leafing aluminum pigments via covalent bonds.

Non-leafing aluminum pigments coated with a silicon-oxygen network can be prepared by subjecting monosilanes, having at least two hydrolyzable groups, to hydrolysis and condensation in the presence of the non-leafing aluminum pigments. The monosilanes having at least two hydrolyzable groups are in particular bisalkoxy, trisalkoxy and tetraalkoxy monosilanes. Preferred alkoxy substituents are C1-C4 alkoxy groups, in particular methoxy and ethoxy groups. The monosilanes having at least two hydrolyzable groups can carry, apart from the hydrolyzable groups, further non-hydrolyzable organic radicals on the silicon atom. For example, alkyl groups or preferably radicals with reactive functional groups or reactive functional groups such as, for example, vinyl, amino, isocyanate, epoxy or in particular (meth)acryloyl groups may be present.

Examples of monosilanes to be hydrolyzed in the presence of the non-leafing aluminum pigments are vinyl trimethoxysilane, aminopropyl triethoxysilane, isocyanatopropyl triethoxysilane, 3-glycidyloxypropyl trimethoxysilane, 3-(meth)acryloxypropyl trimethoxysilane, 3-(meth)acryloxypropyl triethoxysilane.

The monosilanes are hydrolyzed in the presence of the non-leafing aluminum pigments. This can be carried out, as is known from U.S. Pat. No. 5,332,767, in the presence of organic solvents that are not miscible with water, while adding a small amount of water, which is required for the hydrolysis. Preferred non-leafing aluminum pigments coated with a silicon-oxygen network are however obtained when the hydrolysis is carried out in the presence of water-miscible solvents while adding water and alkaline catalysts, for example, amines, as is known from WO 99/57204 and A. Kiehl and K. Greiwe, "Encapsulated aluminum pigments", Progress in Organic Coatings 37 (1999), pages 179 to 183. After the hydrolysis, the non-leafing aluminum pigments coated with a silicon-oxygen network can be isolated by filtering off and drying. During the hydrolysis of the hydrolyzable groups of the monosilanes, silanol groups are formed, which condense to siloxane bridges while forming a silicon-oxygen network. If, for example, solely silanes having four hydrolyzable groups are used, in particular tetraalkoxysilanes, the densest possible silicon-oxygen network ($SiO_2$) is created. The density of the silicon-oxygen network is dependent on the choice of the kind and the amount of the individual monosilanes to be hydrolyzed, for example, a monosilane mixture. The lower the average number of the hydrolyzable groups of the monosilanes, the less dense is the obtained silicon-oxygen network. Preferably bisalkoxy and/or trisalkoxy monosilanes, optionally, in combination with tetraalkoxy silanes, are hydrolyzed in the presence of the non-leafing aluminum pigments. Thereby, particular preference is given to the use of bisalkoxy and/or trisalkoxy monosilanes having reactive functional groups.

The monosilanes can be added and hydrolyzed in one or more steps. In a step after the hydrolysis and condensation, the reactive functionality, introduced into the silicon-oxygen network, can preferably be used for the build-up of a polymer, for example, a three-dimensionally cross-linked polymer. The polymer can be linked to the silicon-oxygen network located on the surface of the non-leafing aluminum pigment in the manner of a resin coating. Suitable functionalized organic compounds of low molecular weight can, for example, be converted to a polymer with the reactive groups on the silicon-oxygen network by polycondensation, polyaddition or radical polymerization. Epoxy groups on the silicon-oxygen network can, for example, be converted to a three-dimensional polymer with polyamines, such as, ethylene diamine and triethylene tetraamine. It is preferred to have (meth)acryloyl groups as the reactive functional groups on the silicon-oxygen network and to radically copolymerize these with radically polymerizable, in particular, multiply olefinically unsaturated compounds, such as, for example, hexanediol diacrylate and trimethylolpropane tri(meth)acrylate.

The term "non-leafing aluminum pigments coated with a silicon-oxygen network" includes in accordance with the above explanations both non-leafing aluminum pigments with a coating of a purely inorganic silicon-oxygen network and non-leafing aluminum pigments with a coating of a silicon-oxygen network modified with corresponding organic groups or polymer-modified.

Examples of commercially available non-leafing aluminum pigments coated with a silicon-oxygen network are the non-leafing aluminum pigments sold by the firm Eckart-Werke under the name "STAPA IL Hydrolan®" and those sold by the firm Schlenk under the name "Aquamet® CP".

As already stated, the pigment content of the water-borne metallic base coats can consist 0 to 40% by weight, in particular 0 to 10% by weight, of one or more pigments different from aluminum pigments, wherein the pigment(s), different from aluminum pigments, are selected by nature and quantity in such a way that the multi-layer coating obtained on the conclusion of process step (3) exhibits a brightness $L^*$ (according to $CIEL^*a^*b^*$, DIN 6174), measured at an illumination angle of 45 degrees to the perpendicular and an observation angle of 15 degrees to the specular, of at least 80 units.

The measurement of the brightness $L^*$ at an illumination angle of 45 degrees to the perpendicular and an observation angle of 15 degrees to the specular is known to the person skilled in the art and can be carried out with commercial professional measuring instruments, for example, the instrument X-Rite MA 68 sold by the firm X-Rite Incorporated, Grandeville, Mich., U.S.A.

Examples of pigments different from aluminum pigments are conventional special-effect pigments imparting to a coating a viewing angle-dependent color and/or brightness flop, such as, non-leafing metal pigments from metals different from aluminum, e.g., of copper, interference pigments, such as, e.g., metal oxide-coated metal pigments, e.g., iron oxide-coated aluminum, coated micas, such as, e.g., titanium dioxide-coated mica, pigments producing a graphite effect, platelet-shaped iron oxide, liquid crystal pigments, coated aluminum oxide pigments, coated silicon dioxide pigments, and also conventional pigments selected from white, colored and black pigments, such as, e.g., conventional inorganic or organic pigments known to the skilled person, for example, titanium dioxide, iron oxide pigments, carbon black, azo pigments, phthalocyanine pigments, quinacridone pigments, pyrrolopyrrol pigments, perylene pigments.

One example of a pigment content of an unmodified water-borne metallic base coat with a silver color shade is a combination of three non-leafing aluminum pigments coated with a silicon-oxygen network:

37.6% by weight of a non-leafing aluminum pigment coated with a silicon-oxygen network with a platelet thickness of 300 to 500 nm and a mean particle size of 19 μm, 37.6% by weight of a non-leafing aluminum pigment coated with a silicon-oxygen network with a platelet thickness of 300 to 500 nm and a mean particle size of 16 μm, 24.8% by weight of a non-leafing aluminum pigment coated with a silicon-oxygen network with a platelet thickness of 200 to 300 nm and a mean particle size of 18 μm.

One example of a pigment content of an unmodified water-borne metallic base coat with a light mint metallic color shade is a combination of the following pigments:

36.2% by weight of a non-leafing aluminum pigment coated with a silicon-oxygen network with a platelet thickness of 300 to 500 nm and a mean particle size of 17 μm, 24.3% by weight of a non-leafing aluminum pigment coated with a silicon-oxygen network with a platelet thickness of 200 to 300 nm and a mean particle size of 20 μm, 0.8% by weight of a phthalocyanine green pigment, 35.9% by weight of a mica pigment, 2.6% by weight of titanium dioxide,
0.2% by weight of carbon black.

One example of a pigment content of an unmodified water-borne metallic base coat with a beige metallic color shade is a combination of the following pigments:

38.8% by weight of a non-leafing aluminum pigment coated with a silicon-oxygen network with a platelet thickness of 300 to 500 nm and a mean particle size of 17 μm,
38.3% by weight of a non-leafing aluminum pigment coated with a silicon-oxygen network with a platelet thickness of 200 to 300 nm and a mean particle size of 20 μm,
4.9% by weight of an iron oxide red pigment,
15.1% by weight of an iron oxide yellow pigment,
2.8% by weight of titanium dioxide,
0.1% by weight of carbon black.

With the ratio of pigment content to resin solids content of 0.3:1 to 0.45:1 present in the water-borne metallic base coats and the composition of the pigment content as explained above, it is guaranteed that UV light can penetrate through a base coat layer formed of modified water-borne metallic base coat and unmodified water-borne metallic base coat, such as is formed as a sub-layer of a multi-layer coating structure of clear lacquer, unmodified and modified water-borne metallic base coat, according to the particular embodiment of the process according to the invention, only according to a UV transmission of less than 0.1% in the wavelength range from 290 to 380 nm and of less than 0.5% in the wavelength range from 380 to 400 nm.

UV transmission may be measured by applying a corresponding structure of modified water-borne metallic base coat and unmodified water-borne metallic base coat to a UV light-transmitting support, for example, a silica glass plate, and measuring the UV transmission in the corresponding wavelength range using a corresponding uncoated UV light-transmitting support as reference.

The unmodified water-borne metallic base coats may also contain fillers, for example, in proportions of 0 to 30 wt % relative to the resin solids content. The fillers do not constitute part of the pigment content of the unmodified water-borne metallic base coats. Examples are barium sulfate, kaolin, talcum, silicon dioxide, layered silicates and any mixtures thereof.

The non-leafing aluminum pigments as well as additional special effect pigments optionally present in the unmodified water-borne metallic base coats are generally initially introduced in the form of a conventional commercial aqueous or non-aqueous paste, optionally, combined with preferably water-dilutable organic solvents and additives and then mixed with aqueous binder. Pulverulent special-effect pigments may first be processed with preferably water-dilutable organic solvents and additives to yield a paste.

White, colored and black pigments and/or fillers may, for example, be ground in a proportion of the aqueous binder. Grinding may preferably also take place in a special water-dilutable paste resin. Grinding may be performed in conventional assemblies known to the person skilled in the art. The formulation is then made up with the remaining proportion of the aqueous binder or of the aqueous paste resin.

The unmodified water-borne metallic base coats may contain conventional coating additives in conventional quantities, for example, of 0.1 to 5 wt. %, relative to the solids content thereof. Examples are antifoaming agents, wetting agents, adhesion promoters, catalysts, levelling agents, anti-cratering agents and thickeners.

The unmodified water-borne metallic base coats may contain conventional solvents, for example, in a proportion of preferably less than 20 wt. %, particularly preferably less than 15 wt. %. These are conventional coating solvents, which may originate, for example, from production of the binders or are added separately. Examples of such solvents are alcohols, for example, propanol, butanol, hexanol; glycol ethers or esters, for example, diethylene glycol di-C1-C6-alkyl ether, dipropylene glycol di-C1-C6-alkyl ether, ethoxypropanol, ethylene glycol monobutyl ether; glycols, for example, ethylene glycol and/or propylene glycol, and the di- or trimers thereof; N-alkylpyrrolidone, such as, for example, N-methylpyrrolidone; ketones such as methyl ethyl ketone, acetone, cyclohexanone; aromatic or aliphatic hydrocarbons, for example, toluene, xylene or linear or branched aliphatic $C_6$-$C_{12}$ hydrocarbons.

The unmodified water-borne metallic base coats have solids contents of, for example, 10 to 30 wt %, preferably of 15 to 25 wt %.

The modified water-borne metallic base coats may be produced from the unmodified water-borne metallic base coats by mixing with an admixture component. In practice, this mixing is performed by the user shortly or immediately before application of the modified water-borne metallic base coat. This applies especially if the admixture component is chemically reactive with constituents of the unmodified water-borne metallic base coat. In the case of industrial coating facilities, the unmodified water-borne metallic base coats in each case of a different color shade are each guided in their own circulating line. The admixture component to be added is preferably used in the form of a single general purpose admixture component, the one admixture component likewise being guided in its own circulating line and automatically mixed with the respective unmodified water-borne metallic base coat using mixing technology conventional in industrial coating facilities, for example, a Kenics mixer. When applying water-borne metallic base coat in a color shade program of n color shades, it is therefore not necessary to provide 2 n circulating lines (in each case n circulating lines for the different colors of unmodified water-borne metallic base coats and for the different colors of modified water-borne metallic base coats), but rather just n circulating lines for the different colors of unmodified water-borne metallic base coats plus one circulating line for the admixture component.

The admixture component is preferably one which is admixed with a coating composition and imparts primer surfacer properties, i.e., the water-borne metallic base coats modified with the admixture component then acquire typical primer surfacer properties (stone chip resistance, levelling of the substrate). Admixture components suitable for such modification of water-borne base coats are known from WO 97/47401, U.S. Pat. No. 5,976,343, U.S. Pat. No. 5,709,909 and U.S. Pat. No. 5,968,655. These patent documents describe processes for the production of decorative multi-layer coatings in which a coating structure produced by the wet-on-wet-on-wet process and consisting of a modified water-borne base coat, a subsequently applied unmodified water-borne base coat and a finally applied clear coat is applied to a baked EDC primer. In these processes, the initially applied modified water-borne base coat is produced from the subsequently applied unmodified water-borne base coat by mixing with an admixture component and replaces the function of a conventional primer surfacer. While WO 97/47401 recommends the addition of polyisocyanate crosslinking agent, U.S. Pat. No. 5,976,343 describes the addition of polyurethane resin and U.S. Pat. No. 5,709,909 and U.S. Pat. No. 5,968,655 describe the addition of a filler paste.

The process according to the particular embodiment of the invention preferably uses one of the admixture components known from WO 97/47401, U.S. Pat. No. 5,976,343, U.S. Pat. No. 5,709,909 or U.S. Pat. No. 5,968,655, i.e., there are three preferred variants for the production of the modified water-borne metallic base coats from the unmodified water-borne metallic base coats: the addition of polyisocyanate to the unmodified water-borne metallic base coat, the addition of polyurethane resin to the unmodified water-borne metallic base coat and the addition of a filler paste to the unmodified water-borne metallic base coat.

In the case of the first preferred variant, the addition of polyisocyanate to the unmodified water-borne metallic base coat, the procedure is such that the unmodified water-borne metallic base coat is mixed with a polyisocyanate admixture component in a ratio by weight of, for example, 1:1 to 5:1, in each case relative to the resin solids content. The resin solids content of the polyisocyanate admixture component is formed by the polyisocyanate itself.

The first preferred variant for the production of modified water-borne metallic base coats is preferably used, if unmodified water-borne metallic base coats, which exhibit a resin solids content comprising one or more hydroxy-functional binders, are used as a starting material. If the hydroxyl value of the resin solids content of the unmodified water-borne metallic base coat is, for example, in the range of from 10 to 180 mg KOH/g, the NCO/OH molar ratio in the modified water-borne metallic base coat is, for example, 1:1 to 25:1. However, in the case of unmodified water-borne metallic base coats with a low-hydroxyl or hydroxyl-free resin solids content, higher NCO/OH molar ratios may also arise in the corresponding modified water-borne metallic base coats. For example, the NCO/OH molar ratios may even extend towards infinity. In such cases, the polyisocyanate in the modified water-borne metallic base coat is consumed by reaction with other constituents which are reactive in relation to isocyanate groups, for example, with water, hydroxy-functional solvents and/or with functional groups of binders which are reactive relative to isocyanate and are different from hydroxyl groups.

Polyisocyanates which may be added individually or in combination to the unmodified water-borne metallic base coats are di- and/or polyisocyanates with aliphatically, cycloaliphatically, araliphatically or less preferably, aromatically attached isocyanate groups, which are liquid at room temperature or are present as an organic solution and at 23° C. generally exhibit a viscosity of 0.5 to 2000 mPa·s, preferably, above 1 and below 1000 mPa·s, particularly preferably below 200 mPa·s. Examples of suitable diisocyanates are hexamethylene diisocyanate, tetramethylxylylene diisocyanate, isophorone diisocyanate, dicyclohexylmethane diisocyanate, and cyclohexane diisocyanate.

Examples of polyisocyanates are those which contain heteroatoms in the residue linking the isocyanate groups. Examples of these are polyisocyanates which contain carbodiimide groups, allophanate groups, isocyanurate groups, uretidione groups, urethane groups, acylated urea groups or biuret groups. The polyisocyanates preferably have an isocyanate functionality higher than 2, such as, for example, polyisocyanates of the uretidione or isocyanurate type produced by di- or trimerization of the above-mentioned diisocyanates. Further examples are polyisocyanates produced by reaction of the above-mentioned diisocyanates with water and containing biuret groups or polyisocyanates produced by reaction with polyols and containing urethane groups.

Of particular suitability are, for example, "coating polyisocyanates" based on hexamethylene diisocyanate, isophorone diisocyanate or dicyclohexylmethane diisocyanate. "Coating polyisocyanates" based on these diisocyanates should be taken to mean the per se known biuret, urethane, uretidione and/or isocyanurate group-containing derivatives of these diisocyanates.

The polyisocyanates may be used in blocked form, though this is not preferred. They may be blocked with conventional blocking agents, for example, with alcohols, oximes, amines and/or CH-acidic compounds.

The blocked or preferably free polyisocyanates may be used as such or as a preparation containing water and/or organic solvent. It may be desirable, for example, for the polyisocyanates to be prediluted with a water-miscible organic solvent or solvent mixture. In this case, it is preferable to use solvents which are inert relative to isocyanate groups, especially where the preferred free polyisocyanates are used. Examples are solvents which do not contain any active hydrogen, for example, ethers, such as, for example, diethylene glycol diethyl ether, dipropylene glycol dimethyl ether, glycol ether esters, such as, ethylene glycol monobutyl ether acetate, diethylene glycol monobutyl ether acetate, methoxypropyl acetate or N-methylpyrrolidone.

Also suitable are hydrophilic polyisocyanates, which are stabilized in the aqueous phase by a sufficient number of ionic groups and/or by terminal or lateral polyether chains. Water-dispersible polyisocyanates are sold as commercial products, for example, by Bayer under the name Bayhydur®.

In the case of the second preferred variant, the addition of polyurethane resin to the unmodified water-borne metallic base coat, the unmodified water-borne metallic base coat is mixed with polyurethane resin in a ratio by weight of, for example, 2:1 to 10:1, in each case relative to the resin solids content.

Particularly suitable polyurethane resins are the polyurethane resins known to the person skilled in the art as water-borne base coat binders, in particular, in the form of aqueous polyurethane resin dispersions.

Examples are polyurethane resins produced by chain extension of isocyanate-functional prepolymers with polyamine and/or polyol and aqueous dispersions containing them. They are described, for example, in U.S. Pat. No. 4,558,090, U.S. Pat. No. 4,851,460 and U.S. Pat. No. 4,914,148.

Further examples are polyurethane dispersions, which may be produced by chain extension of isocyanate-functional prepolymers with water, as described, for example, in U.S. Pat. No. 4,948,829 and U.S. Pat. No. 5,342,882.

Polyurethane dispersions based on polyurethane resins chain-extended by means of siloxane bridges may also be used. These are known from U.S. Pat. No. 5,760,123, for example.

In the case of the third preferred variant, the addition of a filler paste to the unmodified water-borne metallic base coat, the unmodified water-borne metallic base coat is mixed with a filler paste in a ratio by weight of, for example, 2:1 to 5:1, in each case relative to solids content. The filler pastes are preparations which, in addition to filler(s) and a resin solids content comprising binder or paste resin, contain water and/or organic solvent and optionally, conventional additives. The filler pastes have solids contents of, for example, 30 to 60 wt. % with a filler/resin solids content ratio by weight of, for example, 0.5:1 to 1.5:1.

Examples of fillers usable in the filler pastes are barium sulfate, kaolin, silicon dioxide, in particular talcum and any mixtures thereof.

The same resins as in the unmodified water-borne metallic base coat itself may in particular be used as binders or paste resins in the filler pastes. Examples of suitable resins have already been mentioned above in the description of the constituents of the unmodified water-borne metallic base coat.

In the particular embodiment of the process according to the invention, the EDC-primed substrates are initially spray-coated with the modified water-borne metallic base coat in a dry film thickness of, for example, 5 to 20 μm. This is preferably performed using electrostatically-assisted high-speed rotary atomization.

Then, preferably after a brief flash-off phase of, for example, 30 seconds to 5 minutes at an air temperature of 20 to 25° C., the corresponding unmodified water-borne metallic base coat is spray-applied in a dry film thickness of, for example, 2 to 10 μm. This spray application is preferably pneumatic spray application.

This is preferably also followed by a brief flash-off phase of, for example, 30 seconds to 10 minutes at an air temperature of 20 to 100° C., after which the clear coat is applied in a dry film thickness of, for example, 20 to 60 μm.

All known clear coats are in principle suitable as the clear coat. Usable clear coats are here both solvent-containing one-component (1 pack) or two-component (2 pack) clear coats, water-dilutable 1 pack or 2 pack clear coats, powder clear coats or aqueous powder clear coat slurries.

After an optional flash-off phase, the applied water-borne metallic base coat layer consisting of modified and unmodified water-borne metallic base coat and the clear coat layer are jointly cured, for example, by baking, for example, at 80 to 160° C. object temperature.

Using the particular embodiment of the process according to the invention, EDC-primed substrates may be provided with a coating in light metallic color shades, specifically silver color shades, and at the same time a destructive access of UV light through the clear coat and base coat layer to the EDC primer may be prevented, although the base coat layer of modified and unmodified water-borne metallic base coat is only 10 to 30 μm thick. Application and baking of a primer surfacer layer is not necessary and the technological properties of the multilayer coatings meet the requirements of car manufacturers.

The following Examples illustrate the invention. All parts and percentages are on a weight basis unless otherwise indicated Examples Example 1

Comparison a) A silver-colored unmodified water-borne base coat with the following composition was prepared:
12.1 pbw (parts by weight) of resin solids content (5.8 pbw of a polyester polyurethane resin plus 6.3 pbw of a polyester acrylate resin; hydroxyl value of the resin solids content 39.5 mg of KOH/g),
3.0 pbw of non-leafing aluminum pigment (1.13 pbw of (1), 1.13 pbw of (2), 0.74 pbw of (3); cf. Table 1),
1.5 pbw of talcum,
1.0 pbw of HALS (hindered amine light stabilizer)-based free radical scavenger,
0.5 pbw of UV absorber,
0.2 pbw of dimethylethanolamine,
0.5 pbw of defoamer,
0.6 pbw of polyacrylic acid thickener,
1.2 pbw of polypropylene glycol 400,
15 pbw of organic solvent (8 pbw of butylglycol, 1 pbw of N-methylpyrrolidone,
3.3 pbw of n-butanol, 2.7 pbw of n-propanol),
62.9 pbw of water.

b) A modified water-borne base coat was produced by mixing 100 pbw of the unmodified water-borne base coat from step a) with 10 pbw of a 70 wt. % solution of a polyisocyanate cross-linking agent (based on hexamethylene diisocyanate, NCO value 22) in N-methyl pyrrolidone.

Examples 2 to 4

Unmodified water-borne base coats 2a to 4a and modified water-borne base coats 2b to 4b were produced analogously to the procedure in Example 1.

The unmodified water-borne base coats 1a to 4a differ from one another only in the nature and quantitative proportion of the non-leafing aluminum pigments (Table 1).

TABLE 1

| Unmodified water-borne base coats | | | |
|---|---|---|---|
| 1a (Comparison) | 2a (Comparison) | 3a (according to the invention) | 4a (according to the invention) |
| 1.13 pbw (1) | 1.695 pbw (1) | 1.695 pbw (4) | 1.695 pbw (7) |
| 1.13 pbw (2) | 1.695 pbw (2) | 1.695 pbw (5) | 1.695 pbw (8) |
| 0.74 pbw (3) | 1.11 pbw (3) | 1.11 pbw (6) | 1.11 pbw (9) |

The following products of the firm Eckart were used as non-leafing aluminum pigments (1) to (9):
(1) Stapa Hydrolac ® WHH 2154; non-leafing aluminum pigment passivated by phosphating with a platelet thickness of 300 to 500 nm and a mean particle size of 19 μm.
(2) Stapa Hydrolac ® WHH 2156; non-leafing aluminum pigment passivated by phosphating with a platelet thickness of 300 to 500 nm and a mean particle size of 16 μm.
(3) Stapa Hydrolac ® WHH 44668; non-leafing aluminum pigment passivated by phosphating with a platelet thickness of 200 to 300 nm and a mean particle size of 18 μm.
(4) Stapa Hydrolux ® 2154; non-leafing aluminum pigment passivated by chromating with a platelet thickness of 300 to 500 nm and a mean particle size of 19 μm.
(5) Stapa Hydrolux ® 2156; non-leafing aluminum pigment passivated by chromating with a platelet thickness of 300 to 500 nm and a mean particle size of 16 μm.
(6) Stapa Hydrolux ® 8154; non-leafing aluminum pigment passivated by chromating with a platelet thickness of 200 to 300 nm and a mean particle size of 18 μm.
(7) Stapa IL Hydrolan ® 2154; non-leafing aluminum pigment coated with a silicon-oxygen network with a platelet thickness of 300 to 500 nm and a mean particle size of 19 μm.
(8) Stapa IL Hydrolan ® 2156; non-leafing aluminum pigment coated with a silicon-oxygen network with a platelet thickness of 300 to 500 nm and a mean particle size of 16 μm.
(9) Stapa IL Hydrolan ® 8154; non-leafing aluminum pigment coated with a silicon-oxygen network with a platelet thickness of 200 to 300 nm and a mean particle size of 18 μm.

Example 5

Measurement of the UV Transmission of Base Coat Layers

The modified water-borne base coats 1b to 4b were each applied to a quartz glass plate by means of electrostatically-assisted high-speed rotary atomization in 15 μm dry film thickness.

After 2 minutes flashing off at room temperature, the corresponding unmodified (polyisocyanate-free) water-borne base coats 1a to 4a were each pneumatically spray-applied in a 5 μm dry film thickness, flashed off for 5 minutes at 70° C. and baked for 15 minutes at 140° C.

Then, the UV transmission of the silica glass plates coated in this way with silver-colored base coat layers 1b/1a to 4b/4a respectively was photometrically determined (uncoated silica glass plate in reference beam path; UV irradiation from the coated side).

The results are shown in Table 2.

TABLE 2

| | UV transmission in the wavelength range | |
|---|---|---|
| | 290 to 380 nm | 380 to 400 nm |
| Water-borne base coat 1a + 1b | Between 0 and 0.6% | 0.6 to 0.7% |
| Water-borne base coat 2a + 2b | Between 0 and 0.09% | 0.09 to 0.4% |

TABLE 2-continued

| | UV transmission in the wavelength range | |
|---|---|---|
| | 290 to 380 nm | 380 to 400 nm |
| Water-borne base coat 3a + 3b | Between 0 and 0.09% | 0.09 to 0.4% |
| Water-borne base coat 4a + 4b | Between 0 and 0.09% | 0.09 to 0.4% |

Example 6

Production of Multi-Layer Coatings and Technological Tests

The modified water-borne base coats 2b to 4b were each applied to steel test panels provided with an EDC primer by means of electrostatically-assisted high-speed rotary atomization in 15 μm dry film thickness.

After flashing-off for 2 minutes at room temperature the corresponding unmodified (polyisocyanate-free) water-borne base coats 2a to 4a were each spray-applied pneumatically in 5 μm dry film thickness and allowed to flash-off for 5 minutes at 70° C.

The test panels provided in this way with a flashed off silver-colored base coat layer were then further coated in various ways.

a) Test panels with the base coat structures 2b+2a to 4b+4a were each baked for 20 minutes at 125° C. object temperature (simulation of multi-layer coatings without final clear coat layer, as e.g. in the engine compartment or the trunk of automotive bodies).

b) Test panels with the base coat structures 2b+2a to 4b+4a were each spray coated with a commercial two-component polyurethane clear coat in 40 μm layer thickness and after flashing-off for 5 minutes at 20° C. baked for 20 minutes at 125° C. object temperature.

c) The same procedure was observed as in Example 6b). Thereafter the same coating structures of modified and unmodified water-borne base coats and two-component polyurethane clear coat were applied again and under the same conditions as before (simulation of a repair coating).

d) Test panels with the base coat structures 2b+2a to 4b+4a were each spray coated with a two-component polyurethane clear coat in 40 μm layer thickness and after flashing-off for 5 minutes at 20° C. baked for 30 minutes at 160° C. object temperature (simulation of overbake conditions).

e) The same procedure was observed as in Example 6d). Thereafter the same coating structures of modified and unmodified water-borne base coats and two-component polyurethane clear coat were applied again and under the same conditions as before (simulation of a repair coating under overbake conditions).

The test panels produced in this way were subjected to technological tests the results of which are shown in Table 3. To summarize, best results were obtained with coatings 4b+4a (prepared by using base coats containing non-leafing aluminum pigments coated with a silicon-oxygen network) and 3b+3a (prepared by using base coats containing non-leafing aluminum pigments passivated by chromating) compared to coatings 2b+2a (prepared by using base coats containing non-leafing aluminum pigments passivated by phosphating).

TABLE 3

| Coating | Steam jet resistance (in mm)[1] | | Stone chip resistance[2] | | Stone chip resistance after cyclic climate change[3] | | Humidity resistance (cross-cut adhesion)[4] | |
|---|---|---|---|---|---|---|---|---|
| | 2 cm | 15 cm | +20° C. | −20° C. | before | after | before | after |
| 6a (2b + 2a) | 8.0 | 13.4 | | | | | | |
| 6a (3b + 3a) | 3.3 | 0.0 | | | | | | |
| 6a (4b + 4a) | 0.0 | 0.0 | | | | | | |
| 6b (2b + 2a) | 5.8 | 13.6 | 2.5 | 4.0 | 2.5 | 3.5 | 1.0 | 4.0 |
| 6b (3b + 3a) | 1.8 | 0.0 | 1.0 | 1.5 | 1.5 | 1.5 | 0.0 | 0.0 |
| 6b (4b + 4a) | 1.0 | 0.0 | 1.0 | 1.0 | 1.5 | 1.5 | 0.0 | 0.0 |
| 6c (2b + 2a) | | | 2.5 | | | | 3.5 | 4.0 |
| 6c (3b + 3a) | | | 1.5 | | | | 0.0 | 1.0 |
| 6c (4b + 4a) | | | 1.5 | | | | 0.0 | 0.5 |
| 6d (2b + 2a) | | | 2.5 | 2.5 | 2.5 | 3.0 | | |
| 6d (3b + 3a) | | | 1.0 | 1.0 | 1.5 | 1.5 | | |
| 6d (4b + 4a) | | | 1.0 | 1.0 | 1.5 | 1.5 | | |
| 6e (2b + 2a) | | | 2.5 | | | | | |
| 6e (3b + 3a) | | | 1.5 | | | | | |
| 6e (4b + 4a) | | | 1.5 | | | | | |

[1] Steam jet test
The effect of cleaning with a steam jet appliance was simulated by the test panel provided previously with an X-cut (diagonal cross) according to DIN EN ISO 7253 being exposed at the crossing point of the diagonal cross for 20 seconds at a nozzle distance of 2 cm or 15 cm to a steam jet of 90 bar (operating pressure) and 65° C. (measured 10 cm before the nozzle) with a spraying angle of 90 degrees.
The coating delamination was assessed from the side of the diagonal cross in mm.

[2] Stone chip resistance
The testing was carried out by means of stone chip test equipment according to VDA (firm Erichsen, model 508; test conditions: 2 × 500 g steel grit 4-5 mm sharp-edged, 2 bar) at +20° C. and at −20° C.
Evaluation of the damage (indicator 0 = no spalling, indicator 5 = complete detachment).

[3] Stone chip resistance after exposure to alternating temperatures
The stone chip resistance was tested at +20° C. as under 2), but after exposure to changing climatic conditions: 10 12-hour cycles each with 4 hour steady period at temperature limits of 80° C. and −40° C. with alternation between 30 and 80% relative humidity (80% relative humidity at 80° C. temperature limit).

[4] Adhesion test before/after exposure to condensation in a humidity cabinet
An exposure to condensation took place first of all according to DIN 50 017-KK, for a period of 240 h, 24 h conditioning at room temperature.
The adhesion was tested before and after this exposure to condensation by cross-cut test according to DIN EN ISO 2409 (with the 2 mm multiblade tool).
The evaluation is made by comparison with damage patterns, low ratings correspond to better results here.

What is claimed is:

1. A process for the production of multi-layer coatings in metallic color shades, comprising the successive steps:
    (1) applying a 10 to 30 μm thick base coat layer to a substrate provided with an EDC (electrodeposition coating) primer,
    (2) applying a clear coat layer onto the base coat layer,
    (3) jointly curing the base coat and clear coat layers,
    wherein the base coat layer is applied in a first layer and in a second layer;
        the first layer is a modified water-borne metallic base coat produced by mixing an unmodified water-borne metallic base coat with a polyisocyanate cross-linking agent component and
        the second layer comprises the unmodified water-borne metallic base coat, wherein the unmodified water-borne metallic base coat is polyisocyanate free, has a solids content of 15 to 30 wt. % and has a ratio by weight of pigment content to resin solids content of 0.3:1 to 0.45:1,
    wherein the pigment content consists of 90% to 100% by weight of at least one non-leafing aluminum pigment and 0 to 10% by weight of at least one pigment different from aluminum pigments,
    wherein the non-leafing aluminum pigment(s) is defined as an aluminum pigment(s) that has a platelet thickness of over 100 to 500 nm and a mean particle size of 5 to 33 μm and that causes a brightness flop, wherein the non-leafing aluminum pigment(s) comprise a first non-leafing aluminum pigment, a second non-leafing aluminum pigment, and a third non-leafing aluminum pigment, wherein the first non-leafing aluminum pigment has a first platelet thickness of from about 300 to about 500 nm and a first mean particle size of about 19 μm, the second non-leafing aluminum pigment has a second platelet thickness of from about 300 to about 500 nm and a second mean particle size of about 16 μm, and the third non-leafing aluminum pigment has a third platelet thickness of from about 200 to about 300 nm and a third mean particle size of about 18 μm, and wherein all of the non-leafing aluminum pigment(s) are selected from the group consisting of non-leafing aluminum pigments passivated by chromating, non-leafing aluminum pigments coated with a silicon-oxygen network and combinations thereof,
    wherein the pigment(s) different from aluminum pigments are selected by nature and quantity in such a way that the multi-layer coating obtained on the conclusion of process step (3) exhibits a brightness $L^*$ (according to CIE $L^*a^*b^*$, DIN 6174), measured at an illumination angle of 45 degrees to the perpendicular and an observation angle of 15 degrees to the specular, of at least 80 units and wherein at least 50% by weight of the non-leafing aluminum pigment(s) are selected from the group consisting of non-leafing aluminum pigments passivated by chromating, non-leafing aluminum pigments coated with a silicon-oxygen network and combinations thereof;
    whereby the base coat layer has a UV transmission of less than 0.1% in the wavelength range from 290 to 380 nm and of less than 0.5% in the wavelength range from 380 to 400 nm.

2. The process of claim 1 wherein the layer thickness of the base coat layer applied from the modified water-borne metallic base coat is 5 to 20 μm and the layer thickness of the base coat layer applied from the unmodified water-borne metallic base coat is 2 to 10 μm.

3. The process of claim 1 wherein the modified water-borne metallic base coat is applied by electrostatically-assisted high-speed rotary atomization and the unmodified water-borne metallic base coat is pneumatically spray-applied.

4. The process of claim 1 wherein the admixture component imparts primer surfacer properties.

5. The process of claim 1, wherein the substrates are selected from the group consisting of automotive bodies and body parts.

6. The process of claim 1 wherein the cross-linking agent is hexamethylene diisocyanate, tetramethylxylylene diisocyanate, isophorone diisocyanate, dicyclohexylmethane diisocyanate, cyclohexane diisocyanate, or a polyisocyanate which contains carbodiimide groups, allophanate groups, isocyanurate groups, uretidione groups, acylated urea groups or biuret groups.

* * * * *